US012466149B2

(12) United States Patent
Brinz et al.

(10) Patent No.: US 12,466,149 B2
(45) Date of Patent: Nov. 11, 2025

(54) FILLING UNIT FOR A ROTARY PRESS AND A METHOD FOR PROVIDING AN OPTIMIZED ROTARY PRESS

(71) Applicant: Syntegon Technology GmbH, Waiblingen (DE)

(72) Inventors: Thomas Brinz, Bissingen an der Teck (DE); Fabian Werner, Waiblingen (DE); Torsten Grass, Urbach (DE); Matthias Mössinger, Großerlach (DE)

(73) Assignee: Syntegon Technology GmbH, Waiblingen (DE)

( * ) Notice: Subject to any disclaimer, the term of this patent is extended or adjusted under 35 U.S.C. 154(b) by 74 days.

(21) Appl. No.: 18/249,642

(22) PCT Filed: Oct. 22, 2021

(86) PCT No.: PCT/EP2021/079413
§ 371 (c)(1),
(2) Date: Apr. 19, 2023

(87) PCT Pub. No.: WO2022/084538
PCT Pub. Date: Apr. 28, 2022

(65) Prior Publication Data

US 2023/0382072 A1 Nov. 30, 2023

(30) Foreign Application Priority Data

Oct. 23, 2020 (DE) ..................... 10 2020 127 990.6

(51) Int. Cl.
*B30B 15/30* (2006.01)
*B30B 11/08* (2006.01)
*B30B 15/14* (2006.01)

(52) U.S. Cl.
CPC ............ *B30B 15/304* (2013.01); *B30B 11/08* (2013.01); *B30B 15/14* (2013.01)

(58) Field of Classification Search
CPC ........ B30B 15/14; B30B 15/304; B30B 11/08
See application file for complete search history.

(56) References Cited

U.S. PATENT DOCUMENTS 3,322,401 A 5/1967 Georges
4,779,970 A * 10/1988 Irish .................... A23N 17/005
52/171.1

(Continued)

FOREIGN PATENT DOCUMENTS

CN 102744904 A 10/2012
CN 202462948 U 10/2012

(Continued)

OTHER PUBLICATIONS

International Search Report and Written Opinion for Related Application No. PCT/EP2021/079413 dated Jan. 31, 2022 (14 pages, including an English ISR).

(Continued)

*Primary Examiner* — JaMel M Nelson
(74) *Attorney, Agent, or Firm* — Michael Best & Friedrich LLP

(57) ABSTRACT

A filling unit (10) for a rotary press (12) with a filling wheel (14), a dosing wheel (24), optionally a feed wheel (30) and a medium feed unit (36), wherein the blades (22, 28, 34) of the filling wheel (14), dosing wheel (24) and/or feed wheel (30) designed as an impeller wheel (20, 26, 32), are designed in such a way that a conveying surface (40) of the respective blades (22, 28, 34) can be varied in shape, and a method for providing an optimized rotary press is proposed.

16 Claims, 12 Drawing Sheets

(56) References Cited

U.S. PATENT DOCUMENTS

| | | | |
|---|---|---|---|
| 2010/0015264 A1 | 1/2010 | Kraemer | |
| 2017/0170710 A1 | 6/2017 | Song | |
| 2017/0282421 A1 | 10/2017 | Kitamura et al. | |
| 2017/0355162 A1* | 12/2017 | Oezcoban | B30B 11/003 |
| 2018/0036981 A1 | 2/2018 | Tsukada et al. | |
| 2021/0170710 A1 | 6/2021 | Klaer et al. | |

FOREIGN PATENT DOCUMENTS

| | | | | |
|---|---|---|---|---|
| CN | 202862643 U | 4/2013 | | |
| CN | 104228126 A | 12/2014 | | |
| CN | 205326356 U | 6/2016 | | |
| CN | 106217935 A | 12/2016 | | |
| CN | 110662647 A | 1/2020 | | |
| CN | 213321941 U | 6/2021 | | |
| DE | 3527186 A1 | 2/1986 | | |
| DE | 202007002707 U1 | 7/2008 | | |
| DE | 102016110556 A1 | 12/2017 | | |
| EP | 1776998 A1 | 4/2007 | | |
| EP | 3222414 A1 | 9/2017 | | |
| EP | 3406436 A1 | 11/2018 | | |
| GB | 2025303 A | 1/1980 | | |
| JP | 46026855 | 9/1971 | | |
| JP | S4626855 Y1 | 9/1971 | | |
| JP | 2009285662 A | 12/2009 | | |
| JP | 2017064786 A | 4/2017 | | |
| JP | 2017177139 A | 10/2017 | | |
| JP | 2020520809 A | 7/2020 | | |
| JP | 2023546480 A | 11/2023 | | |
| KR | 1020150139756 A | 12/2015 | | |
| RU | 2266822 C2 | 12/2005 | | |
| SU | 852636 A1 | 8/1981 | | |
| SU | 1050878 A1 | 10/1983 | | |
| WO | WO-2015186905 A1 * | 12/2015 | | B01F 27/87 |

OTHER PUBLICATIONS

German Patent Office Action for Related Application No. 102020127990.6 dated Jun. 8, 2021 (13 pages, including an English statement of relevance).

Russian Patent Office Action for Related Application No. 2023112780/05(027181), corresponding to PCT/EP2021/079413, dated Oct. 13, 2023 (12 pages including English translation).

United States Patent Office Action for U.S. Appl. No. 18/249,650 dated Jan. 27, 2025 (16 pages).

Japanese Patent Office Action for Related Application No. 2023-524636 dated Apr. 23, 2024 (9 pages including English machine translation).

Korean Patent Office Action for Application No. 1020237009201 dated Oct. 29, 2024 (17 pages including English summary translation).

Chinese Patent Office Action for Application No. 202180072043.9 dated Jul. 1, 2025 (22 pages including English translation).

* cited by examiner

FILLING UNIT FOR A ROTARY PRESS AND A METHOD FOR PROVIDING AN OPTIMIZED ROTARY PRESS

BACKGROUND

The invention relates to a filling unit for a rotary press and a method for providing an optimized rotary press.

Rotary presses are used in the pharmaceutical, technical or chemical industry or in the food industry to produce tablets or pellets in large quantities from powdery materials.

Rotary presses have a rotary driven die disk with die bores arranged therein, which move on a circular path. Typically, lower and upper stamps are provided which move with the die disk on a circular path and move up and down during rotation. The lower and upper stamps are designed in such a way that they engage with their upper and lower stamp ends, respectively, in the die bores arranged in the die disk, in order to compress the powder material introduced therein into tablets.

The powder to be pressed is fed to the die bores via a hopper with an attached filling unit with rotating impeller wheels. Such filling units are shown, for example, in EP 3 406 436 A1 and DE 20 2007 002 707 U1.

With the aid of the impeller wheels, the powder flow from the hopper into the die bores is supported, in order to achieve a constant filling and thus a constant weight of each individual tablet.

The impeller wheels are usually available in a flat or round blade shape with a circular hub. The flow behavior or the properties of the powder are influenced, for example, by the immersion depth of the blades and by the blade shapes. (e.g. flat blades with a rectangular cross-section or cylindrical blades with a circular cross-section).

The flat blade profile is suitable for free-flowing, non-sticky compounds and ensures good filling of the die bores as long as the cohesive forces of the materials remain quite low.

For powder materials, with higher cohesive forces (fines content, moisture content, surface texture), round shaped blades have a smaller contact area and cut better through the powder bed instead of compacting it.

Depending on the flow behavior/properties of the powder, the filling unit can be equipped with appropriate impeller wheels to obtain an adapted dosing behavior and can therefore be converted manually.

SUMMARY

The task of the present invention is to provide a filling unit for a rotary press and a method for providing an optimized rotary press which eliminates the above disadvantages.

This task is solved by the filling unit according to the invention for a rotary press. The filling unit according to the invention comprises:

A filling wheel, which is designed to fill a medium to be dosed, in particular powder, into die bores of a die disk of the rotary press. The filling wheel is designed as an impeller wheel. The filling wheel has blades and is designed to convey the medium to be dosed by a rotating movement by means of its blades. In other words, the blades of the filling wheel designed as an impeller wheel move on a circular path around the center of the filling wheel.

The filling unit also has a dosing wheel, which is designed to accurately dose an amount of medium to be dosed into the respective die bores of the die disk. The dosing wheel is designed as an impeller wheel. The dosing wheel has blades and is designed to accurately dose the amount of medium to be dosed by sweeping its blades over the die bores of the die disk by means of a rotating motion. In this process, excess medium is removed by sweeping over the die bores of the die disk. In other words, the blades of the dosing wheel, which is designed as an impeller wheel, move on a circular path around the center of the dosing wheel, thereby sweeping over the die bores.

The filling wheel thus moves the powder into the die bores of the die disk. Typically, the lower side of the die bore is closed by a corresponding lower stamp. Before the die bore reaches the dosing wheel, the lower stamp can be raised slightly to a precisely intended position, in order to define a precisely defined size of the die bore. Subsequently, the powder portion protruding upwards from the die bore is "skimmed off", i.e. removed, by means of the dosing wheel.

The filling unit can have a feed wheel which is designed to feed the medium to be dosed to the filling wheel. The feed wheel is designed as an impeller wheel. The feed wheel has blades and is designed to convey the medium to be fed to the filling wheel by a rotating movement by means of its blades. In other words, the blades of the feed wheel, which is designed as an impeller wheel, move on a circular path around the center of the feed wheel. In doing so, they convey the medium to be dosed to the filling wheel.

The filling unit further comprises at least one medium feed unit, which is designed to supply the medium to the filling wheel. Alternatively or additionally, the medium feed unit can supply the medium to the feed wheel. The medium enters the filling unit via the medium feed unit. The medium feed unit may comprise, for example, a hopper, a tube or a hose.

The blades of the filling wheel, dosing wheel and/or feed wheel designed as an impeller wheel are designed in such a way that a conveying surface of the respective blades can be varied in shape.

The conveying surface of the blades is formed by the surface of the blades with which the respective impeller wheel conveys the medium. The conveying surface is therefore that part of the blades which, during operation of the filling unit, is designed and set up to contact the medium and to convey or dose it by means of the respective rotational movement.

The variation in the shape of the conveying surface can be realized by rotating the blades of the filling wheel, dosing wheel and/or feed wheel designed as an impeller wheel about their respective extension axis. For this purpose, the blades of the filling wheel, dosing wheel and/or feed wheel designed as an impeller wheel can be designed to rotate about their respective extension axis. The blades can be brought into at least two rotational positions by rotation about their respective extension axis, in which the blades form differently shaped conveying surfaces. The medium to be dosed can be conveyed with differently shaped conveying surfaces depending on the rotational position of the blades.

By rotating/turning the blades into different rotational positions, differently shaped conveying surfaces can be realized. The rotation/turning of the blades can be realized, for example, by a gear mechanism, a sliding mechanism, a crank drive, a cable pull, a piston drive and/or cam-controlled.

In particular, the blades can have a conveying surface in the form of a circular section, especially a semicircle, on a first side; in particular, a flat conveying surface can be provided on an opposite side. By simply rotating through 180 degrees, the conveying surface can thus be changed back and forth between the shape of a blade with a circular cross-section and a blade with, for example, a square cross-section.

In particular, the blades may have a triangular cross-section. In particular, the cross-section of the blades may correspond to an isosceles triangle, especially an equilateral triangle. In this case, the blades can be rotated to a position in which a corner of the triangular cross-section points downwards and thus forms an angular underside of the blades. Thus, a "sharp-edged" underside can be realized. The blades can also be rotated so that one corner of the triangular cross-section points upward. In this case, one of the triangular sides of the cross-section forms the underside of the blades. Thus, it is possible to choose between the different undersides of the blades and a desired setting. Of course, the conveying surface of the blades with a triangular cross-section can also be varied by rotating the blades. Here, too, a choice can be made between a conveying surface that is flat and a conveying surface that is angular.

In particular, the blades can have a rectangular, especially square, cross-section. In the case of a rectangular cross-section, two opposite sides can be shorter and the other two opposite sides can be longer. The two longer sides of the rectangular cross-section form a larger side surface of the blades compared to the two shorter sides of the rectangular cross-section. Thus, by rotating the blades, it is possible to choose between a conveying surface with a larger area and a conveying surface with a smaller area.

The shape of the conveying surface can be changed by a variable inclination of the blades with respect to a radial direction extending from the axis of rotation of the respective impeller wheel.

In other words, the blades of the filling wheel, dosing wheel and/or feed wheel designed as an impeller wheel can be designed in such a way that an angle spanned by the respective extension axis of the blades (or their extension) and a radial direction of the respective impeller wheel extended from the axis of rotation can be varied. The inclination of the blades can also be realized by means of a gear mechanism. A type of "cable pull" solution for varying the inclination of the blades is also conceivable.

The shape of the conveying surface can be changed by a variable curvature of the blades of the filling wheel, dosing wheel and/or feed wheel designed as an impeller wheel. By a curvature in the sense of this application is meant an at least sectional, in particular arc-shaped, deviation from a straight course. In particular, the curvature may be an at least sectional, especially arcuate, deviation from the radial direction extending from the axis of rotation of the respective impeller wheel. The blades may have at least one section with a variable curvature.

A variable curvature of the blades can be implemented, for example, by a bimetal, a cable pull and/or a traction or pressure element. It is also conceivable that the variable curvature can be implemented along only one section or several sections of the blades. In particular, the variable curvature can be implemented along the entire length of the blades.

By changing the shape of the conveying surface of the blades, the filling wheel, dosing wheel and/or feed wheel designed as an impeller wheel can be adapted to different media with different flow behavior/properties without having to replace the individual impeller wheels. Thus, removal of the respective impeller wheels is unnecessary. The shape of the conveying surface of the impeller wheels can be varied/changed in the mounted state of the respective impeller wheel without having to remove the respective impeller wheel for this purpose.

Thus, it is conceivable that the shape of the conveying surface of the blades can be varied/adjusted during operation of the rotary press.

It is conceivable that the shape of the conveying surfaces can be varied during the tablet manufacturing process or while the respective impeller wheels convey the medium to be dosed through the filling unit. However, it can also be provided that the tablet manufacturing process or the conveying of the medium to be dosed through the filling unit is paused (interrupted) for a short time, then the shape of the conveying surfaces is changed and subsequently the tablet manufacturing process or the conveying of the medium to be dosed through the filling unit is resumed. In both cases, it is not necessary to dismantle the respective impeller wheels or the filling unit.

The blades of the filling wheel, dosing wheel and/or feed wheel designed as an impeller wheel can be designed in such a way that they can be displaced parallel to the axis of rotation of the respective impeller wheel. In other words, the blades are designed to be adjustable in height. Thus, for example, when the blades whose cross-section deviates from a circular shape are rotated about their respective extension axis, the lower edge of the blades can be kept at a constant height or level. In this way, it can be ensured that there are no gaps between the impeller wheel and the element of the filling unit arranged below it. In other words, by adjusting the height of the blades, it can be ensured that while the medium is being conveyed by means of the respective impeller wheel, the entire medium to be conveyed is gripped and conveyed by the blades.

The blades of the filling wheel, dosing wheel and/or feed wheel designed as an impeller wheel have a triangular or at least partially rounded cross-section. Of course, cross sections with other geometric shapes are also conceivable. For example, a foursquare, in particular square, cross-section is conceivable.

The blades of the filling wheel, dosing wheel and/or feed wheel designed as an impeller wheel can have a constant cross-section along a range of their respective extension axis. In particular, the cross section can be the same along the entire respective extension axis. However, it is also conceivable that the area of the cross-section along the respective extension axis becomes larger or smaller from the respective axis of rotation in the radial direction or changes along the extension axis, in particular uniformly.

The number of blades of the filling wheel, dosing wheel and/or feed wheel designed as an impeller wheel can vary per respective impeller wheel, be even and/or odd.

The blades of the filling wheel, dosing wheel and/or feed wheel designed as an impeller wheel can be designed to be interchangeable. In particular, the blades can be designed as an exchange element of the individual impeller wheels. In this way, the blades can be quickly and easily exchanged for other blades, in particular blades with a different cross-section. For example, if a blade is damaged, the corresponding blade can be replaced without having to replace the entire impeller wheel. In addition, the interchangeability extends the number of different shapes of the conveying surface.

The filling wheel, dosing wheel and/or feed wheel designed as an impeller wheel can each have blades that have a different cross-section along their respective extension axis. In other words, the filling wheel, dosing wheel and/or feed wheel can each have differently shaped blades.

For example, the filling wheel may have blades with a triangular cross-section, the dosing wheel may have blades with a circular cross-section, and the feed wheel may have blades with a foursquare cross-section.

The blades of the filling wheel, dosing wheel and/or feed wheel designed as an impeller wheel can be arranged in such a way that an extension of the respective extension axis runs at a distance from an axis of rotation of the respective impeller wheel. Thus, the extension of the respective extension axis forms a tangent to a circle about the rotation axis, the circle having a non-zero radius. In other words, the blades are arranged inclined with respect to a radial direction starting from the center of the respective impeller wheel. In other words, the extension of the respective extension axis and the radial direction starting from the center of the respective impeller wheel span an angle different from zero, in particular between zero and 90 degrees, in particular between zero and 45 degrees, in particular between 0 and 20 degrees.

The filling unit can be designed in such a way that the direction of rotation and/or the rotational speed of the filling wheel, dosing wheel and/or feed wheel designed as an impeller wheel can be varied. The direction of rotation and/or the speed of rotation can be preset before tablet production according to the respective medium (or powder). However, it is also conceivable that the direction of rotation and/or the rotational speed can be varied during tablet production, i.e. while the medium is being conveyed (or while the respective impeller wheels are rotating). In particular, the direction of rotation can be varied independently of the rotational speed.

The filling unit can be designed in such a way that the feed wheel can be switched into or out of a conveying path of the medium to be dosed. This can be done in particular by a pivoting movement of the feed wheel. In particular, the feed wheel can be pivoted about an axis of rotation of the dosing wheel designed as an impeller wheel. A corresponding pivoting device can be provided for this purpose. The feed wheel can be bridged or bypassed in particular by means of a second medium feed unit. It is also conceivable that the medium feed unit can be designed to be displaceable in such a way that, by displacing the medium feed unit, it is possible to select whether the conveying path of the medium to be dosed leads through the feed wheel or not.

The conveying path of the medium to be dosed in this case means the path of the medium through the filling unit into the die bores.

The medium feed unit can include a conveying switch. By means of this conveying switch, the medium to be dosed can be fed either to the feed wheel or to the filling wheel. In this way, a choice can be made as to whether the conveying path of the medium leads via the feed wheel or not, without the feed wheel having to be removed or the feed wheel having to be switched out/swung out of the conveying path.

The filling unit can have at least one electric motor. The electric motor can drive the filling wheel, dosing wheel, or feed wheel designed as an impeller wheel, directly or indirectly, for example via at least one gear wheel and/or a timing belt. It is also conceivable that several impeller wheels are driven by the electric motor. However, it is also conceivable that each impeller wheel is driven by a separate electric motor.

Alternatively or additionally, the electric motor can vary, directly or indirectly, for example via at least one gear wheel and/or a timing belt, the rotational position of the blades and/or the inclination or the angle spanned by the respective extension axis of the blades and a radial direction of the respective impeller wheel extending from the rotational axis. It is conceivable that the rotational position of the blades and the inclination of the blades with respect to a radial direction extending from the axis of rotation of the respective impeller wheel are varied by means of the same electric motor. However, it is also conceivable that a separate electric motor can be provided in each case for varying the rotational position and the inclination of the blades.

In particular, several electric motors can form an electric motor group and be designed as one exchange element. In this way, several electric motors can be quickly and easily exchanged as one element for another electric motor group (e.g. in the event of damage). Likewise, it is conceivable that the gear wheels that transmit torque from the electric motors to the impeller wheels can be formed as a gear wheel group, and these can also be formed as an exchange element.

In particular, the electric motor can be in the form of a servo motor or a compressed air motor. In particular, all electric motors can be in the form of servo motors or compressed air motors. It is also conceivable that a pneumatic and/or hydraulic drive can be provided as an alternative or in addition to the electric motor. Other types of drive and a manual drive ("by hand") are also conceivable.

The blades of the filling wheel, dosing wheel and/or feed wheel designed as an impeller wheel can be designed to be rotatable by more than 180°, in particular by 360°. In other words, the blades can be set up to be freely rotatable by at least more than 90°, in particular by 180°, in particular by 270°, in particular by at least 360°. The blades can thus be brought into various rotational positions within the specified angular range. In particular, the blades are designed to be rotatable about their respective extension axis.

Due to the large angle of rotation, e.g. at least 180°, it is possible to use different (more) sides of the blade profile (cross-section of the blades) for conveying the medium to be dosed on the die disk.

The blades of the filling wheel, dosing wheel and/or feed wheel designed as an impeller wheel can have a cross-section which has at least one corner and a rounded section. The blades can, for example, have a drop-shaped cross-section.

Such a cross-section of the blades, particularly in conjunction with a large angle of rotation, e.g. at least 180°, results in an increased number of different shapes of the conveying surfaces of the respective blades (profile sections), which can be used for dosing, particularly in conjunction with the die disk.

The above task is further solved by the method according to the invention for providing an optimized rotary press having the features of the independent claim. The method according to the invention comprises the steps:

Providing a first rotary press having an adjustable filling unit. Thereby, the adjustable filling unit comprises at least one element with at least one adjustable configuration parameter. By configuration parameter in the sense of this application is meant a variable which influences the conveyance of the medium within the filling unit (or rotary press) and/or properties of the tablets produced (e.g. tablet quality).

Producing a plurality of tablets with the first rotary press with different settings of the configuration parameter. For example, batches of tablets can be produced, whereby each batch can be produced with a different setting of the configuration parameter.

Thus, by means of the first rotary press with the adjustable filling unit, various settings for a configuration parameter can be tried out in order to find the optimum settings. It is not necessary to change and/or exchange the corresponding elements relating to the configuration parameter.

Analyzing the tablets produced for desired properties in order to identify a tablet (or batch of tablets) with preferred properties among the tablets produced. These can be, in particular, quality characteristics of the tablet (e.g. particularly good strength, weight, breaking strength, web height).

Identifying the setting of the configuration parameter setting at which the tablet (or batch) with preferred properties was produced.

Providing at least a second rotary press with an optimized filling unit. In this case, the optimized filling unit has at least one element with a fixed predetermined configuration parameter, in which the tablet (or tablet batch) has been produced with preferred properties.

In other words, after the optimum configuration parameter has been identified by means of the first rotary press with the adjustable filling unit, this configuration parameter is transferred to a second rotary press. This configuration parameter is then no longer adjustable on the second rotary press. It is also conceivable that the first rotary press is designed with such an optimized filling unit. In other words, the first rotary press with an adjustable filling unit can be converted into a rotary press with an optimized filling unit.

Because the elements of the second rotary press already have the optimum configuration parameters and no longer need to be adjusted, these elements can be designed more simply. Additional elements/parts required for adjustability can be omitted. This makes the corresponding elements less expensive to manufacture. The second rotary press can thus be designed to be less expensive and smaller. In addition, the elements of the second rotary press can be designed to be more robust and durable.

When producing tablets using a rotary press, a certain start-up time is necessary. For example, it takes some time for the medium to be dosed to be evenly distributed along the entire conveying path. This means that the first tablets of a batch may have different properties from the other tablets of the same batch.

It is therefore conceivable that, in order to identify the optimum configuration parameter, the first tablets of a batch are not taken into account in the analysis of the tablets produced. However, it is also conceivable that the batch has such a large number of tablets that the deviation of the tablet properties between the first tablets and the remaining tablets of a batch is negligible due to the large number of tablets in the batch.

The adjustable filling unit of the first rotary press is a filling unit as described above.

The adjustable configuration parameter can be the direction of rotation or the speed of rotation of the filling wheel, dosing wheel and/or feed wheel designed as an impeller wheel.

It is equally conceivable that the adjustable configuration parameter can be speed, upstream pressure, main pressure, weight dosing, immersion depth or position of the compact in the die.

The switching of the feed wheel out of the conveying path or into the conveying path of the medium to be dosed can also represent a configuration parameter. In other words, a configuration parameter can represent the arrangement of the feed wheel in or outside the conveying path of the medium to be dosed.

The adjustable configuration parameter can be the shape of the conveying surfaces of the blades or the inclination of the blades. The shape of the conveying surfaces of the blades can be changed by rotating the blades around their respective extension axis. The inclination of the blades means the angle formed by the respective extension axis (or its extension) of the blades and a radial direction of the respective impeller wheel extended from the axis of rotation.

During the step of producing tablets with the first rotary press, several configuration parameters can be changed simultaneously. It is conceivable that the multiple configuration parameters can be set on the same element. However, it is also conceivable that the multiple configuration parameters can be set on multiple elements, whereby in particular one configuration parameter can be set on each element.

BRIEF DESCRIPTION OF THE DRAWINGS

Further features, details and advantages of the invention are apparent from the wording of the claims and from the following description of embodiments based on the drawings. Showing:

DETAILED DESCRIPTION

In the following description and in the figures, the corresponding components and elements have the same reference signs. For the sake of clarity, not all reference signs are shown in all figures.

Figure 1:
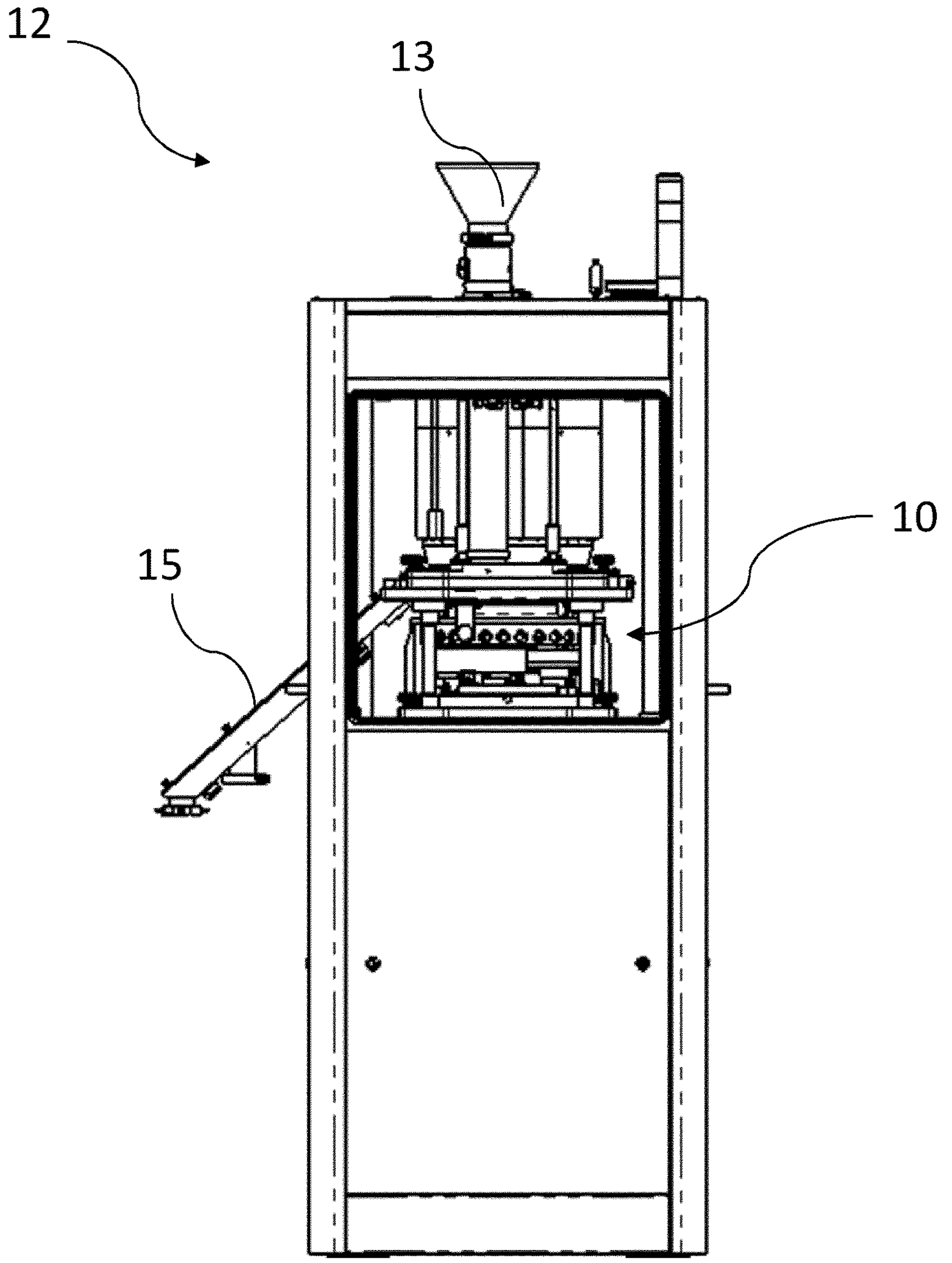
FIG. 1 a side view of a rotary press with a filling unit.

FIG. 1 shows a side view of a rotary press 12 with a filling unit 10. The medium to be dosed, i.e. the powder to be pressed into the tablets, enters the rotary press 12 via a hopper 13. After the tablets have been pressed, they are conveyed out of the rotary press 12 via the discharge chute 15.

Figure 2:
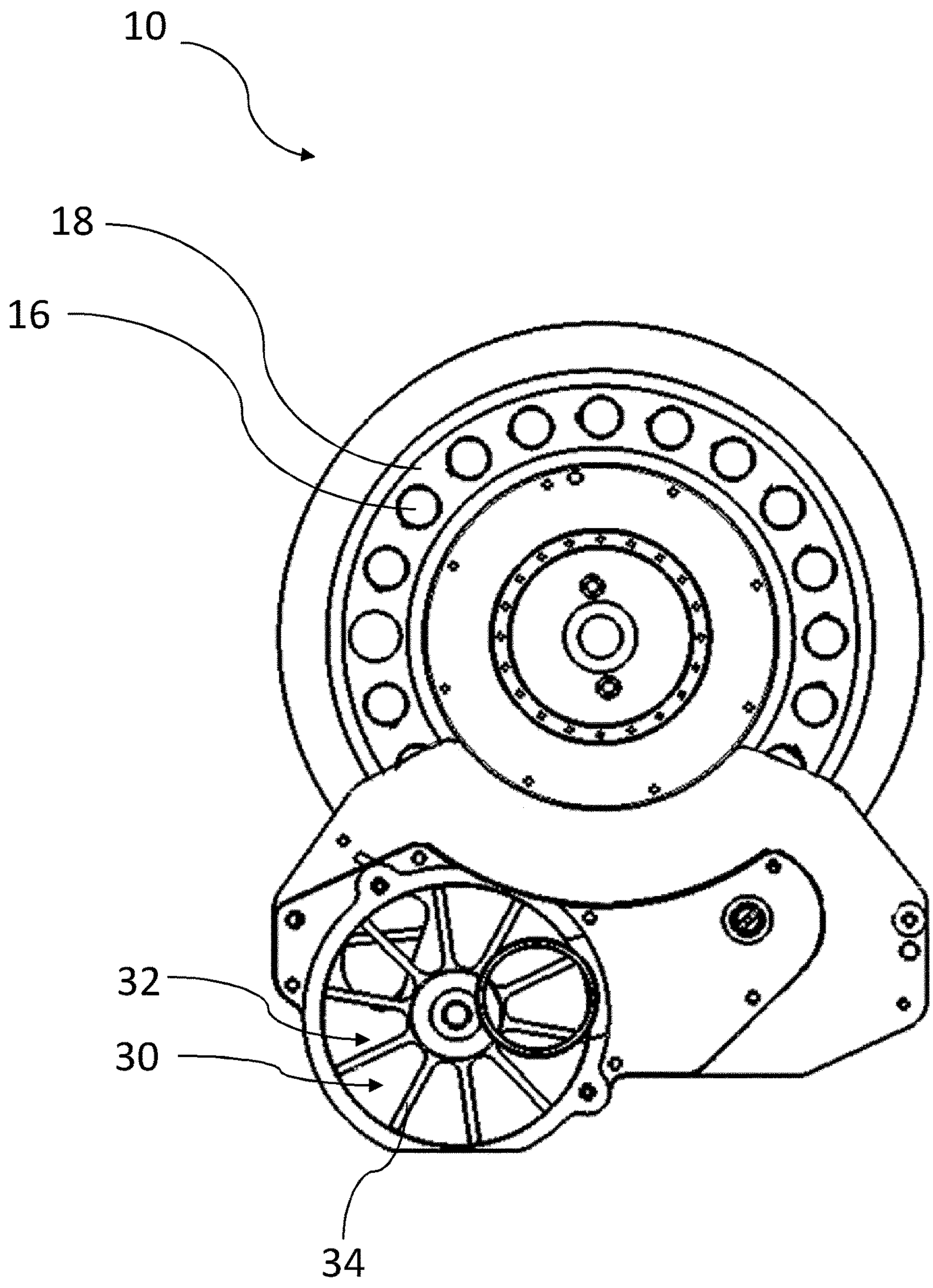
FIG. 2 a top view of the filling unit with a die disk according to FIG. 1.

FIG. 2 shows a top view of the filling unit 10 with a die disk 18 according to FIG. 1. The die disk 18 has several die bores 16 arranged on a circular path, into which the medium to be compressed into the tablets is dosed by means of the filling unit 10.

Figure 3:
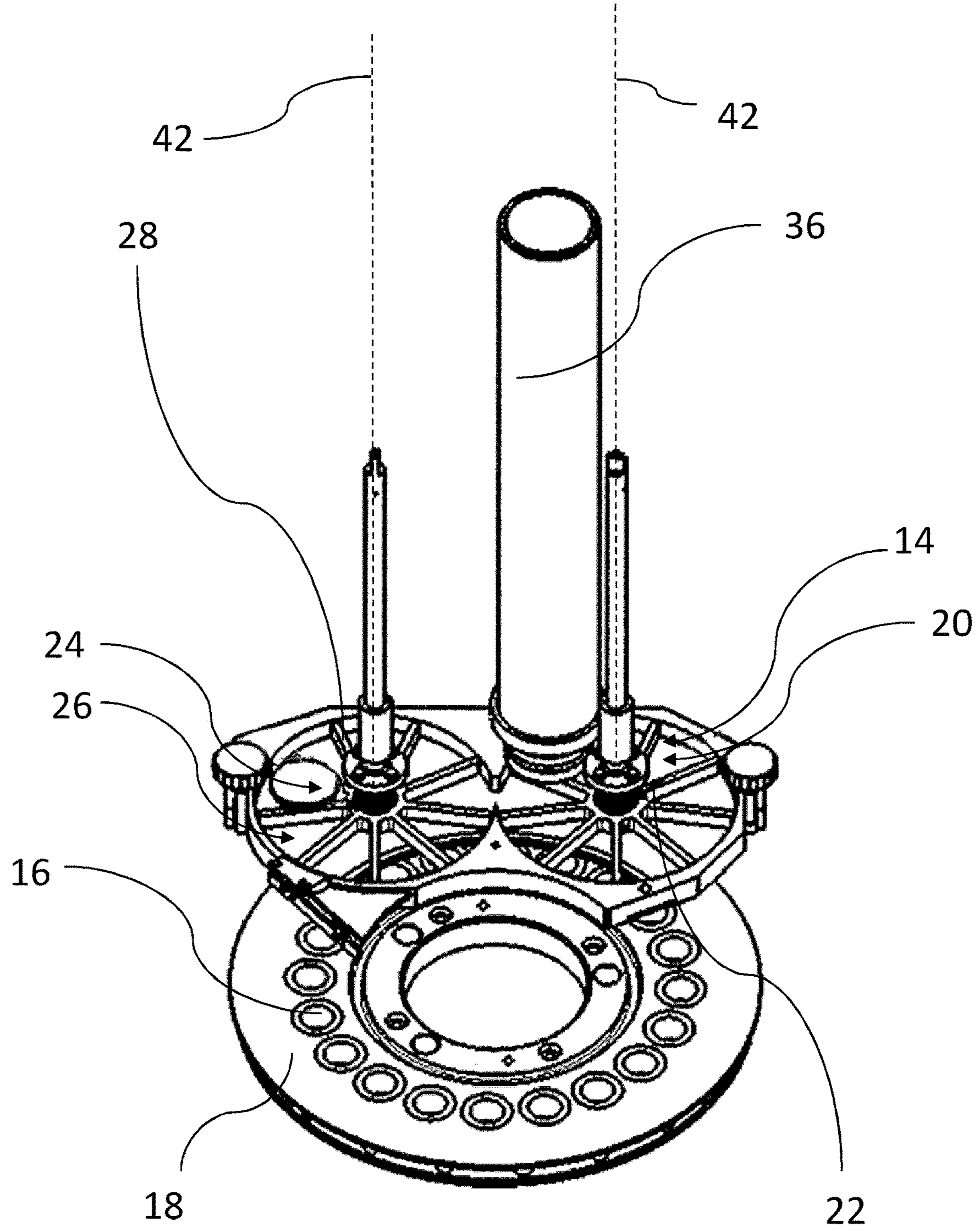
FIG. 3 a perspective view of a further embodiment of the filling unit.

FIG. 3 shows a perspective view of a further embodiment of the filling unit 10. The medium to be dosed is supplied to a filling wheel 14 via the medium feed unit 36. In the present case, the medium feed unit 36 is designed as a straight pipe. The filling wheel 14 is designed as an impeller wheel 20 with blades 22. The filling wheel 14 conveys the medium to be dosed into the die bores 16 of the metering disk 18. This is done by rotating the filling wheel 14 about its axis of rotation 42 (indicated by a dashed line).

The amount of medium to be dosed in the die bores 16 of the die disk 18 is precisely dosed by means of a dosing wheel 24. The dosing wheel is designed as an impeller wheel 26 with blades 28. This is done by rotating the dosing wheel 24 about its axis of rotation 42 (indicated by a dashed line). In the process, the die bores 16 are swept by the blades 28 of the dosing wheel 24 so that excess medium is removed and a precisely defined quantity of medium remains in the die bores 16.

The amount of medium remaining in a die bore 16 is then compressed into a tablet. This can be realized, for example, by means of a lower and/or upper stamps which are moved relative to each other (not shown).

Figure 4:
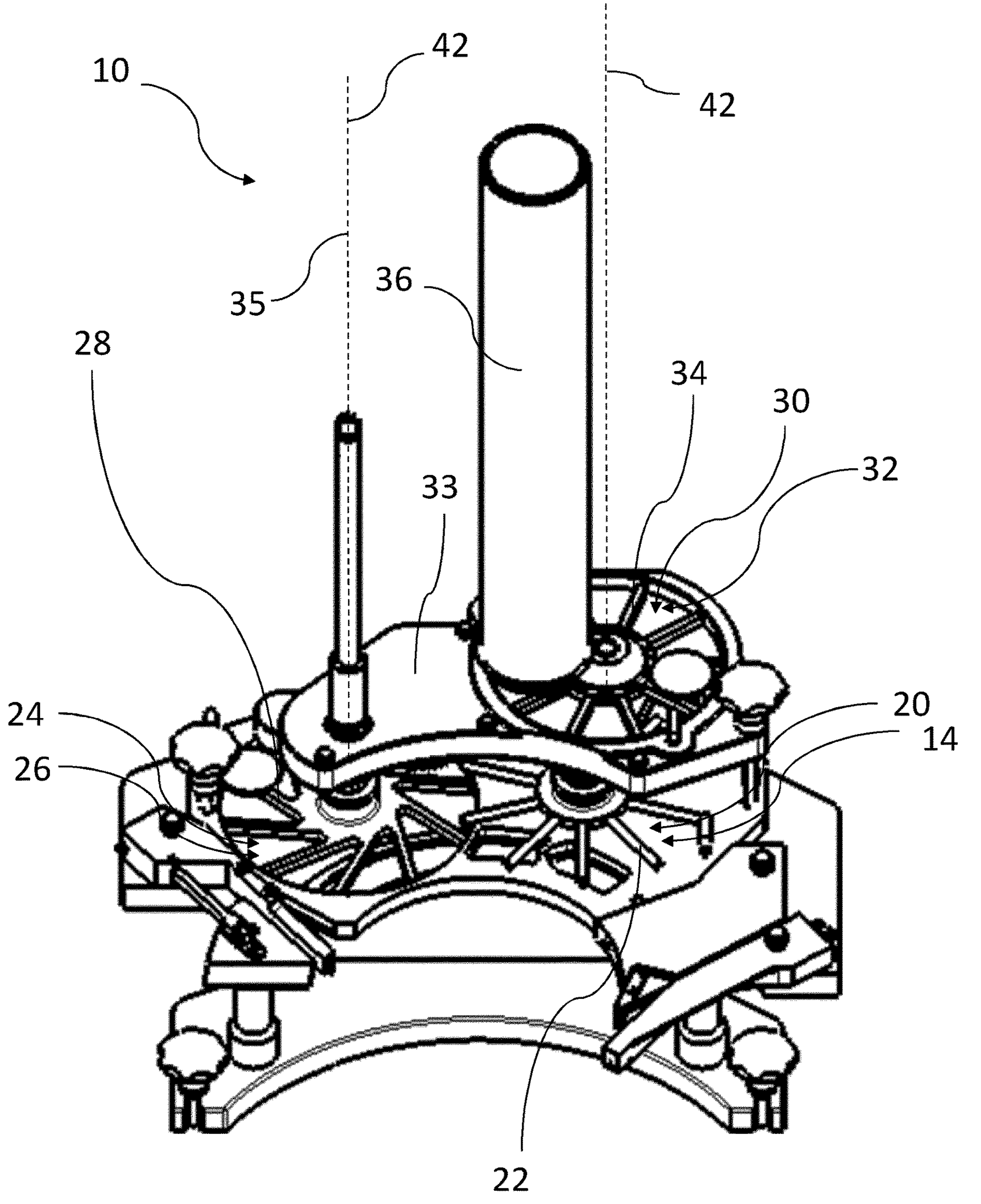
FIG. 4 a perspective view of a further embodiment of the filling unit.

FIG. 4 shows a perspective view of a further embodiment of the filling unit 10. Analogous to the embodiment shown in FIG. 3, the filling unit 10 shown has a filling wheel 14 and a dosing wheel 24. In the present embodiment, the die disk 18 with the die bores 16 is not shown. In this embodiment, the filling unit 10 also has a feed wheel 30.

The medium feed unit 36 feeds the medium to be dosed to the feed wheel 30. The feed wheel 30 is designed as an impeller wheel 32 with blades 34. The medium to be dosed is fed to a filling wheel 14 by means of the feed wheel 30. This is done by rotating the feed wheel 30 around its axis of rotation 42 (indicated by a dashed line).

The feed wheel 30 is arranged on a pivoting device 33. The pivoting device 33 and thus also the feed wheel 30 can be pivoted about the pivot axis 35. In the present case, the pivot axis 35 and the axis of rotation 42 of the dosing wheel 24 are identical. Thus, the feed wheel 30 can be pivoted out of the conveying path of the medium or pivoted into the conveying path of the medium.

The medium conveying path shown is via the medium feed unit 36, which feeds the medium to the feed wheel 30. This conveys the medium to the filling wheel 14 by rotating about its axis of rotation 42. The filling wheel 14 fills the die bores 16 (not shown) by rotating about its axis of rotation 42 (not shown). Subsequently, the medium filled in the die bores 16 is precisely dosed in by sweeping over it with the blades 28 of the dosing wheel 24. This is also accomplished by rotating the dosing wheel 24 about its axis of rotation 42.

If the feed wheel 30 is pivoted out of the conveying path about the pivot axis 35, the conveying path of the medium then runs over the medium feed unit 36, which feeds the medium directly to the filling wheel 14. The medium is then filled into the die bores by the filling wheel and then precisely dosed in by the dosing wheel 24 (see above).

Alternatively or in addition to the pivoting device 33, the medium feed unit 36 can have a conveying switch (not shown) which optionally feeds the medium either directly to the feed wheel 30 or to the filling wheel 14. In this way, it is possible to select between a conveying path with the feed wheel 30 and a conveying path without the feed wheel 30, without the feed wheel 30 having to be pivoted out of the conveying path for this purpose.

Figure 5:
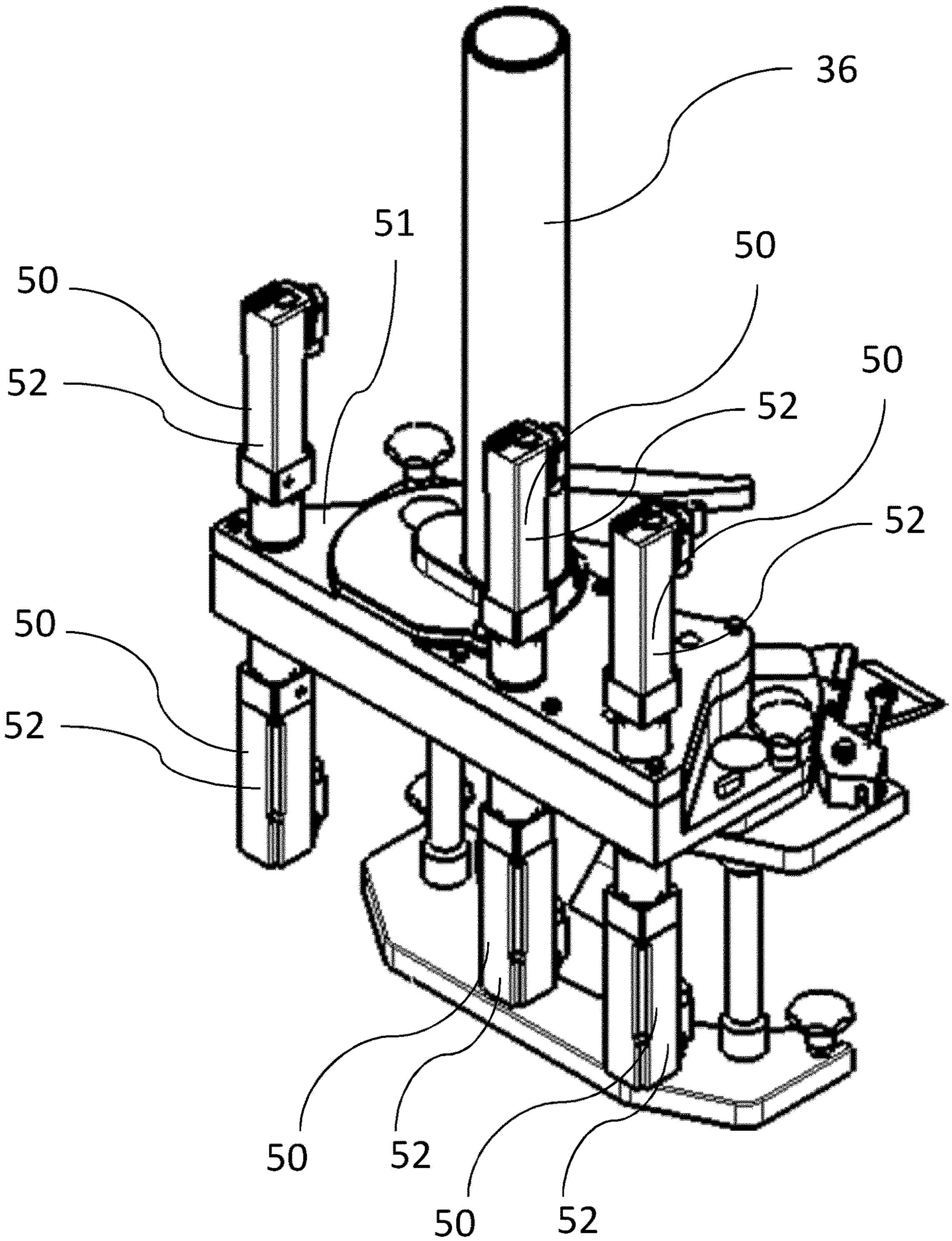
FIG. 5 a perspective view of a further embodiment of the filling unit.

FIG. 5 shows a perspective view of a further embodiment of the filling unit 10. In this case, the filling wheel 14, the feed wheel 30 and the dosing wheel 24 are not shown covered by a cover 51.

Six electric motors 50, which are in the form of servomotors 52, are shown here. In each case, two servomotors 52 are arranged opposite each other. Whereby each servo motor 52 can be controlled or operated individually and independently of the remaining servo motors 52. The servo motors 52 may be formed as a servo motor group which is formed as an interchangeable element. For example, the three upper servomotors 52 in FIG. 5 may form one replacement element and the three lower servomotors 52 in FIG. 5 may form another replacement element. For example, in the event of a defect, the servomotors 52 can be quickly and easily replaced.

Figure 6:
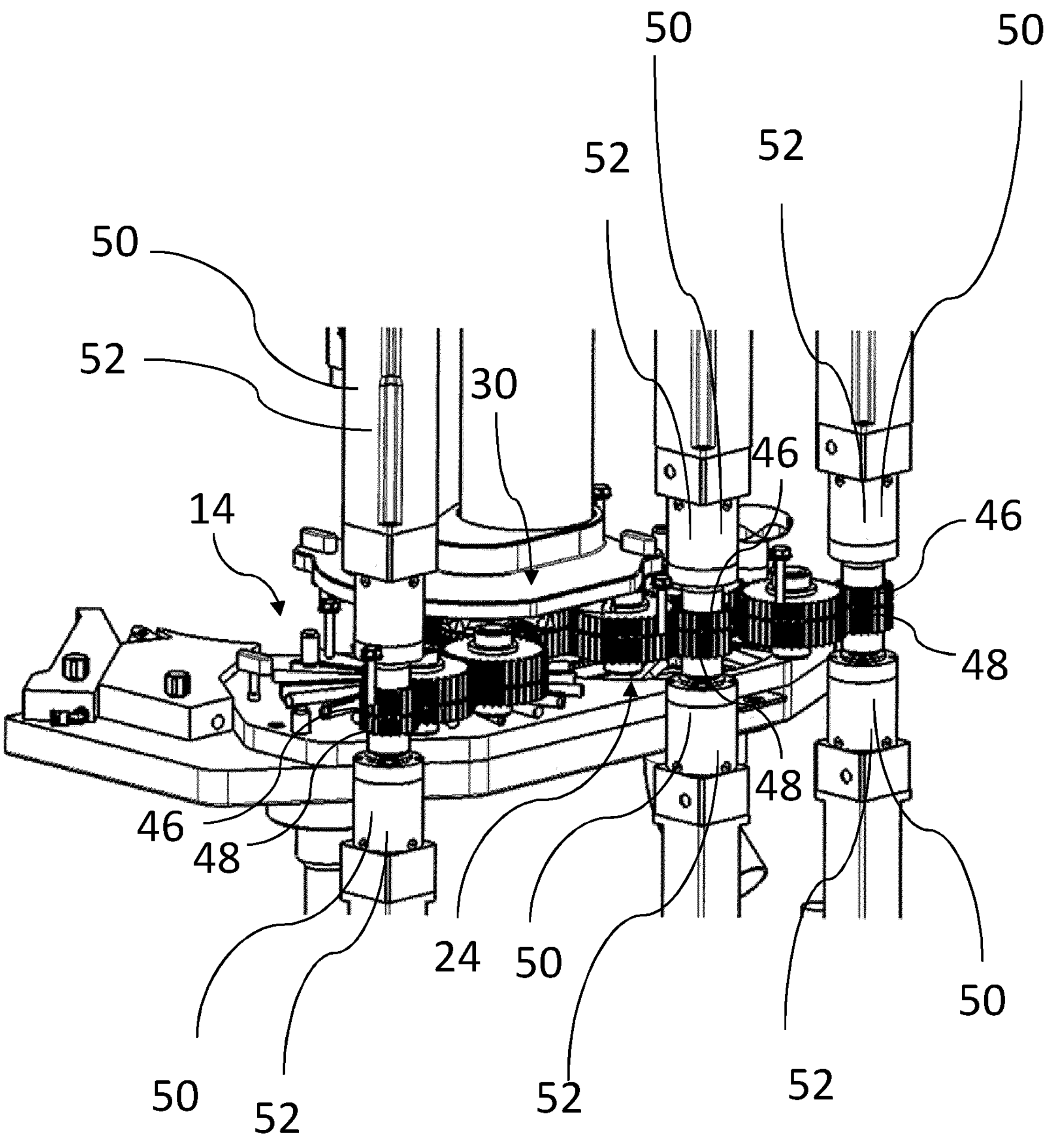
FIG. 6 a section of a perspective view of the filling unit according to FIG. 5 from another perspective.

FIG. 6 shows a section of a perspective view of the filling unit 10 according to FIG. 5 from another perspective. Here, the cover 51 is not shown, so that the filling wheel 14, the feed wheel 30 and the dosing wheel 24, which are hidden in FIG. 5, can be seen.

The filling wheel 14, the feed wheel 30 and the dosing wheel 24 are coupled to the servomotors 52 by means of gear wheels 46, 48. A torque can be transmitted from the respective servomotor 52 to the filling wheel 14, feed wheel 30 or dosing wheel 24 by means of the gear wheels 46, 48. The transmitted torque can then be used to rotate the filling wheel 14, the feed wheel 30 and/or the dosing wheel 24 designed as an impeller wheel 20, 26, 32 and/or can be used to adjust the rotational position, the inclination and/or the curvature of the blades 22, 28, 34 of the corresponding impeller wheel 20, 26, 32.

Figure 7:
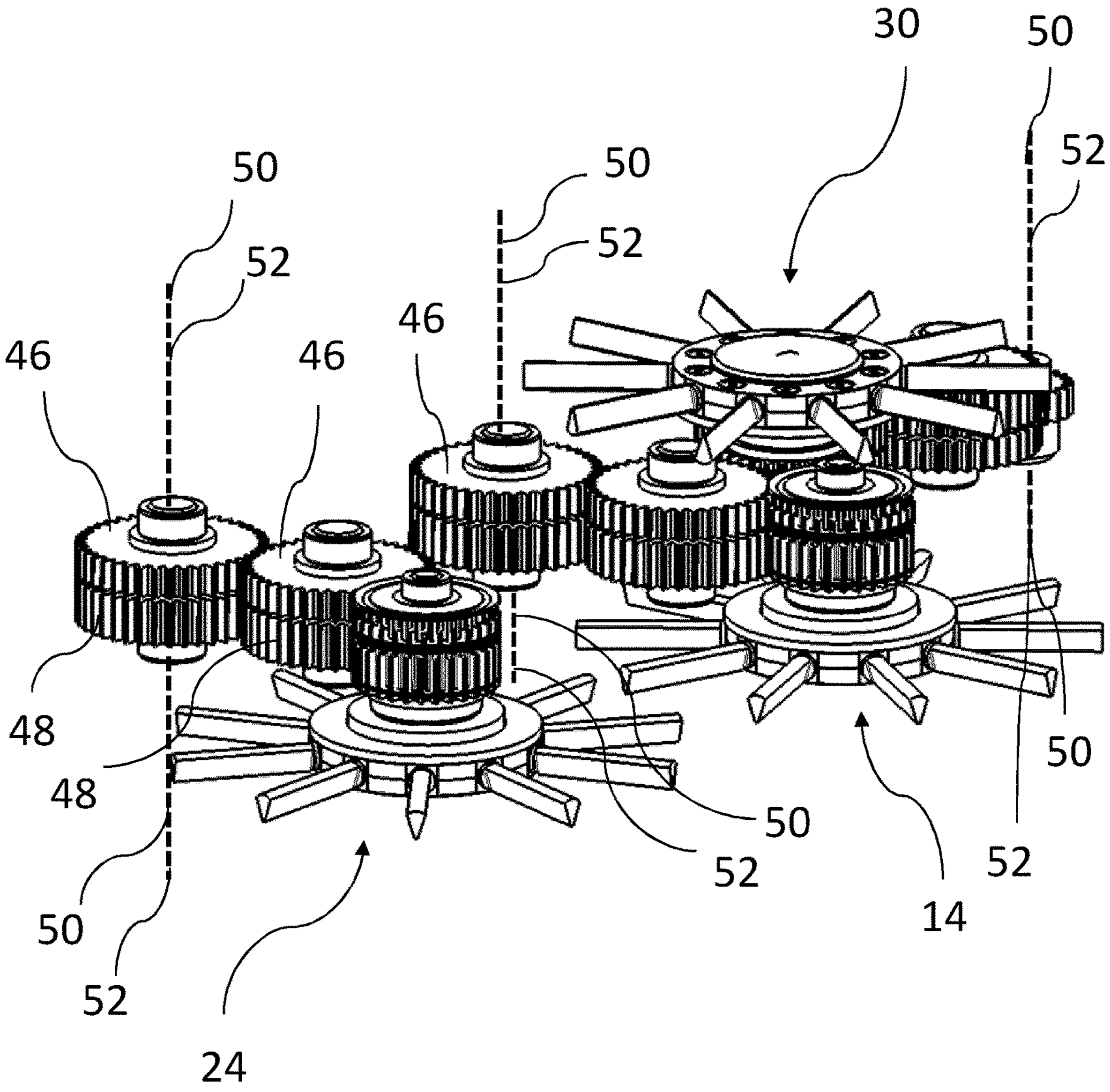
FIG. 7 a perspective view of a filling wheel, dosing wheel and feed wheel designed as an impeller wheel together with gear wheels.

FIG. 7 shows a perspective view of a filling wheel 14, dosing wheel 24 and feed wheel 30 together with gear wheels 46, 48. Six servomotors 52 are indicated by dashed lines. Here, the torque of three servomotors 52 arranged at the top in FIG. 7 is transmitted in each case to a first gear wheel 46. This meshes with a second gear wheel 46 and the second gear wheel 46 meshes with a third gear wheel 46, which is arranged on the filling wheel 14, dosing wheel 24 or feed wheel 30. Correspondingly, the torque from the three remaining servo motors 52 (servo motors 52 arranged at the bottom in FIG. 7) is each transmitted to a first gear wheel 48. This meshes with a second gear wheel 48 and the second gear wheel 48 meshes with a third gear wheel 48, which is arranged on the filling wheel 14, dosing wheel 24 and feed wheel 30, respectively. Thus, the torque of the respective servo motor 52 is transmitted to the filling wheel 14, the dosing wheel 24, and the feed wheel 30, respectively.

Figure 8:
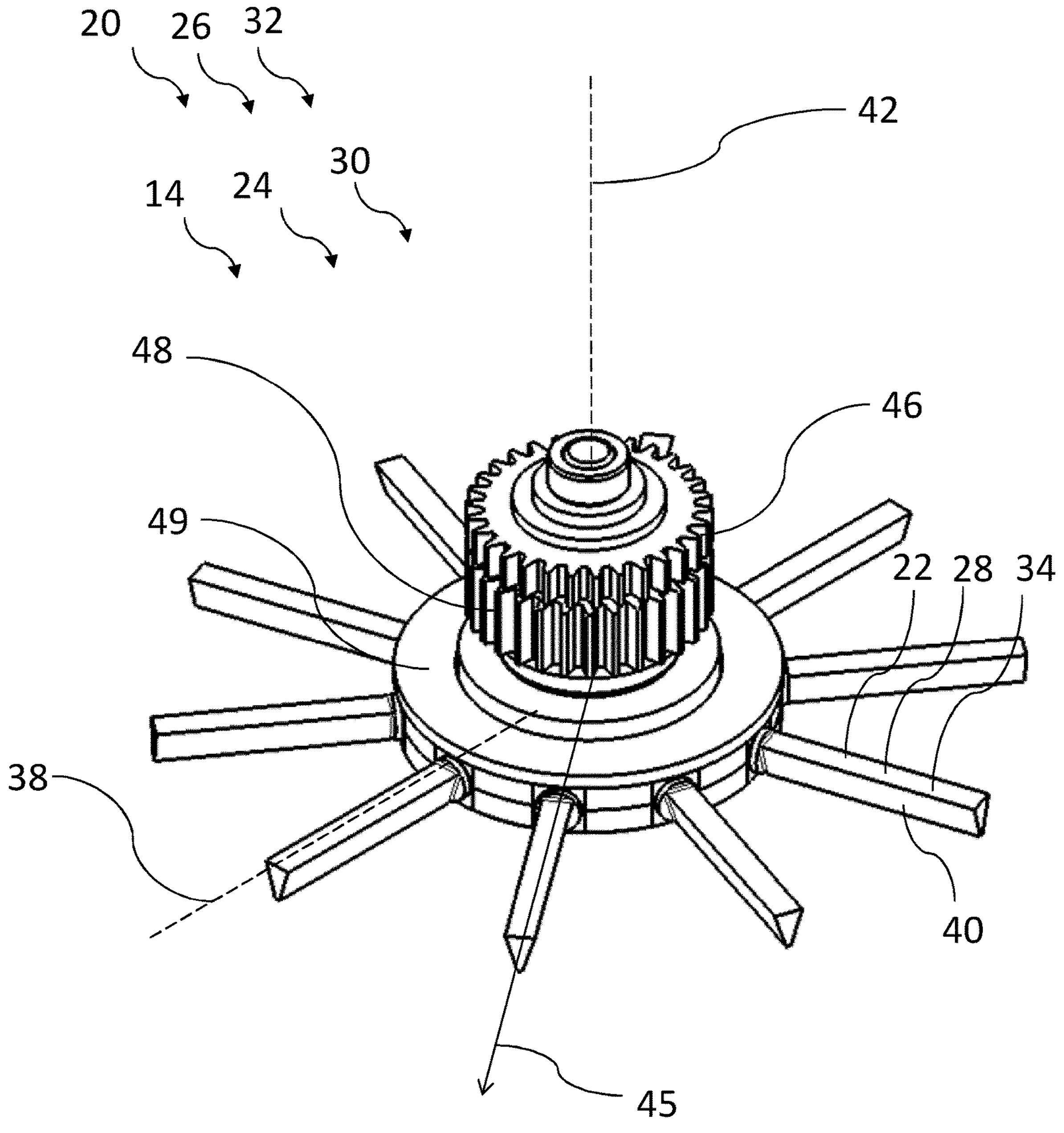
FIG. 8 a perspective view of an impeller wheel according to FIG. 7.

FIG. 8 shows a perspective view of an impeller wheel 20, 26, 32 according to FIG. 7. The impeller wheel 20, 26, 32 shown can be a filling wheel 14, feed wheel 30 or a dosing wheel 24.

The impeller wheel 20, 26, 32 has an axis of rotation 42 about which the filling wheel 20, 26, 32 can be rotated. The impeller wheel 20, 26, 32 has ten blades 22, 28, 34. Presently, the blades 22, 28, 34 extend along a radial direction 45 extending radially outwardly from the axis of rotation 42 and perpendicular to the axis of rotation 42. The blades 22, 28, 34 have an extension axis 38 that corresponds to the longitudinal axis of the blades 22, 28, 34.

In the present case, the blades 22, 28, 34 have a triangular cross-section, with one corner of the triangle representing the lower edge of the respective blade 22, 28,34 in the position shown.

The impeller wheel 20, 26, 32 has an upper gear wheel 46 and a lower gear wheel 48, wherein the impeller wheel 20, 26, 32 and the two gear wheels 46, 48 each have the same axis of rotation 42, i.e. are arranged coaxially to one another. The impeller wheel 20, 26, 32 is designed to be rotatable via the lower gear wheel 48. This can be realized, for example, by coupling the lower gear wheel 48 and the impeller wheel 20, 26, 32 in a rotationally fixed manner.

When the impeller wheel 20, 26, 32 is rotated, it rotates about the axis of rotation 42 and conveys the medium located between the individual blades 22, 28,34 with a respective conveying surface 40.

Via the upper gear wheel 46, the blades 22, 28,34 can be rotated about their respective extension axis 38. It is also conceivable that the height (displacement parallel to the axis of rotation 42), the inclination and/or the curvature of the blades 22, 28,34 can be changed via the gear wheel 46. The elements required for this, for example in the form of corresponding mechanics and/or electrics, can be arranged in a body 49 of the impeller wheel 20, 26, 32.

The lower gear wheel 48 is arranged between the upper gear wheel 46 and the impeller wheel 20, 26, 32. Of course, it is conceivable that the upper gear wheel 46 is arranged between the lower gear wheel 48 and the impeller wheel 20, 26, 32 or that the functions of the upper and lower gear wheel 46, 48 are interchanged.

Figure 9:
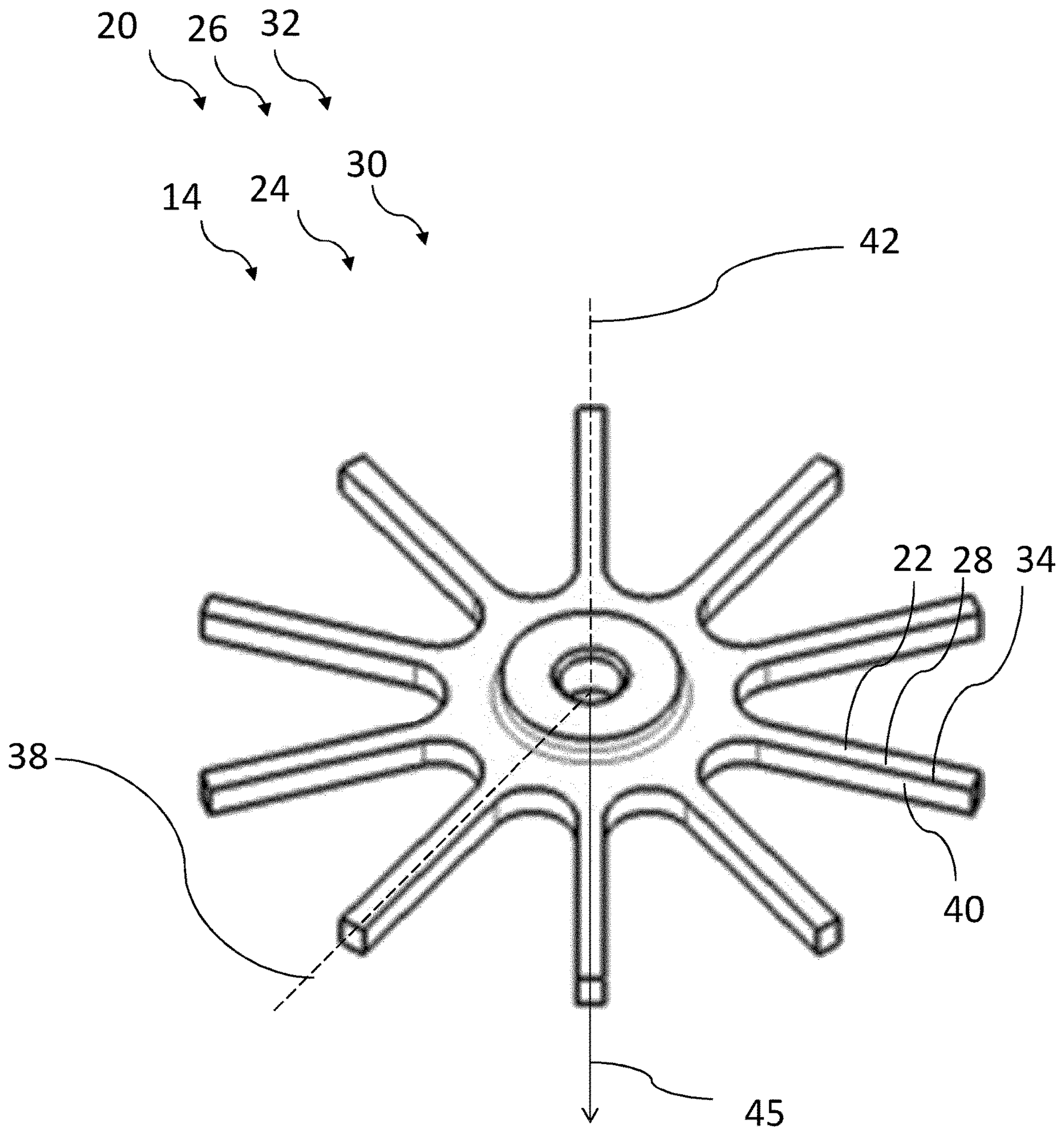
FIG. 9 a perspective view of a further embodiment of the impeller wheel.

FIG. 9 shows a perspective view of a further embodiment of the impeller wheel 26, 32. In this case, the impeller wheel 20, 26, 32 has straight blades 22, 28, 34 with a foursquare (square) cross-section.

Figure 10:
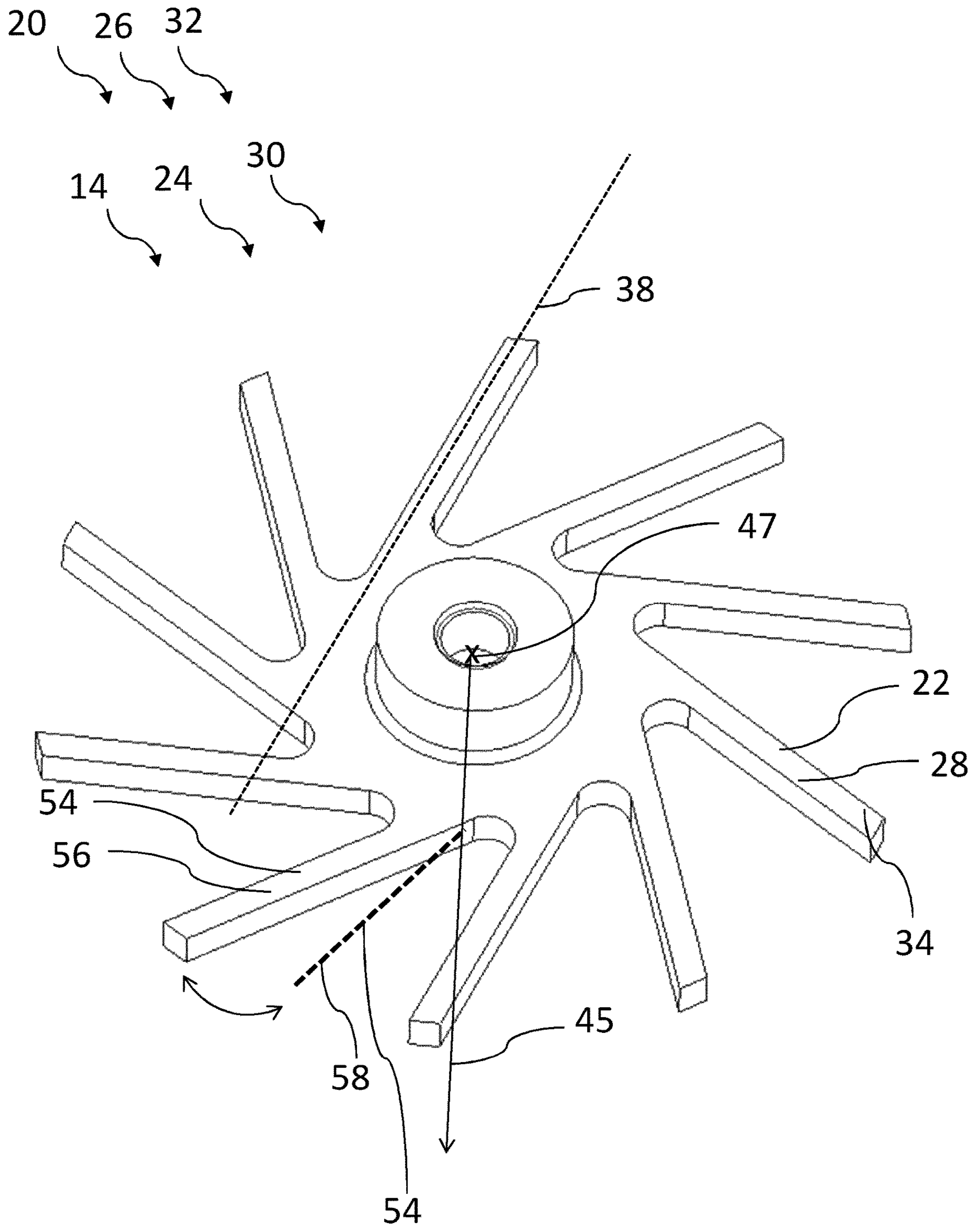
FIG. 10 a perspective view of a further embodiment of the impeller wheel.

FIG. 10 shows a perspective view of a further embodiment of the impeller wheel 26, 32. An impeller wheel 20, 26, 32 with inclined blades 22, 28, 34 is shown here. The extension of the respective extension axis 38 of the blades 22, 28, 34 (indicated by dashed lines) does not intersect the center point of the impeller wheel 20, 26, 32 marked as "x" and designated by the reference number 47. The respective extension axis 38 or its extension is thus arranged at a distance from the center point 47.

In an impeller wheel 20, 26, 32 having a variable inclination, the blades 22, 28, 34 can be adjusted such that the angle between the extension axis 38 (or extension thereof) of the respective blade 22, 28, 34 and the radial direction 45 can be varied. For example, a blade 54 can be moved from its sketched first arrangement 56 to a second arrangement 58 indicated by a dashed line. As can be clearly seen, the angle between the blade 54 in the first arrangement 56 and the radial direction 45 is a different (greater) angle than that between the blade 54 in the second arrangement 58 and the radial direction 45. Varying the inclination is indicated here by a double arrow.

Figure 11:
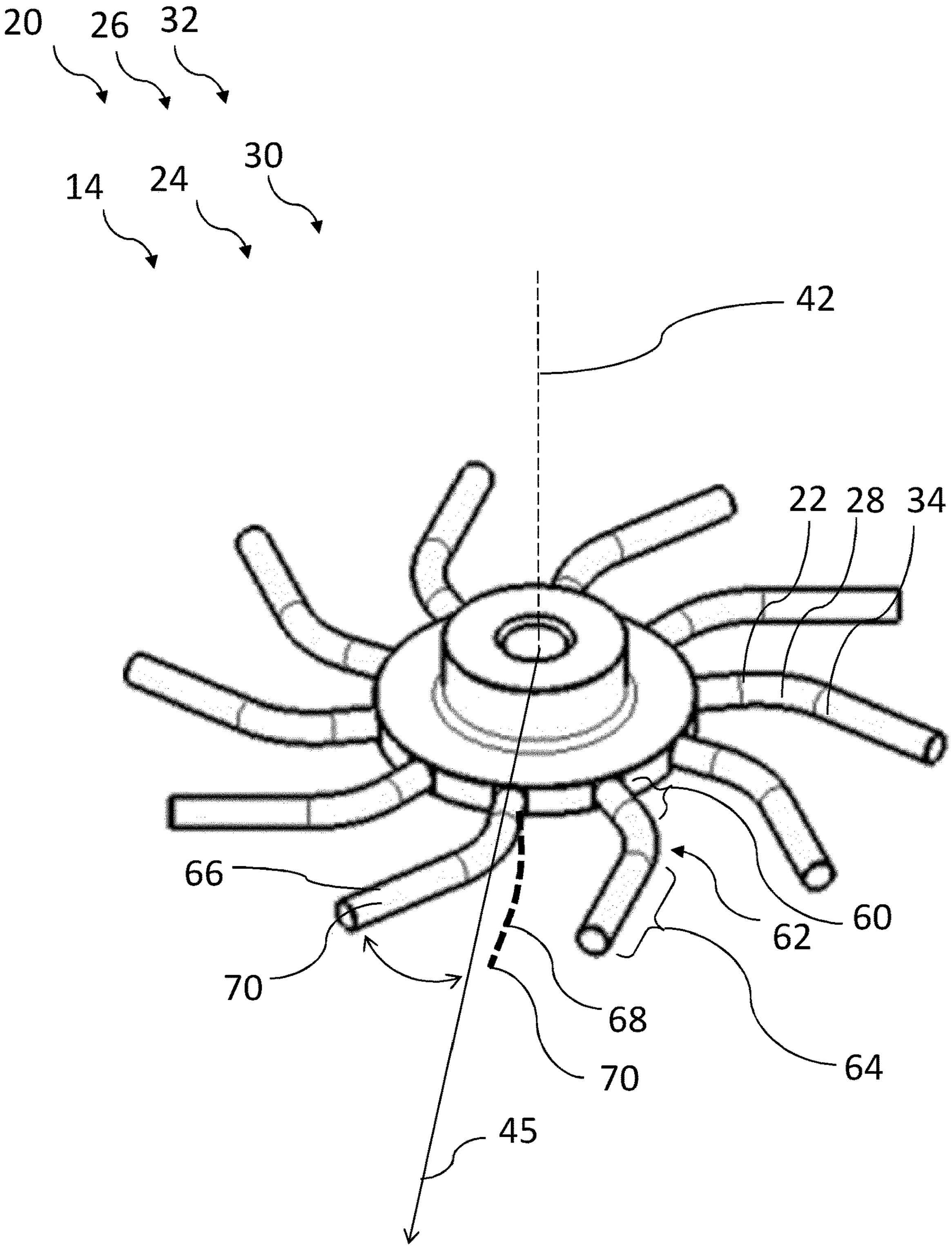
FIG. 11 a perspective view of a further embodiment of the impeller wheel, and FIG. 12 a flow diagram of a method for providing an optimized rotary press.

FIG. 11 shows a perspective view of a further embodiment of the impeller wheel 26, 32. The present embodiment of the impeller wheel 20, 26,32 has blades 22, 28, 34 with a curvature. The blades 22, 28,34 each have a first section 60 in which the blades 22, 28,34 extend along the radial direction 45 (i.e., straight radially outward). Adjacent to the first section 60 is a second section 62 that is curved with respect to the radial direction 45. The second section 62 is followed by a third section 64, which is again straight (analogous to the first section 60).

A possible variable curvature of the blades 22, 28, 34 of the impeller wheel 20, 26, 32 is indicated (analogous to FIG. 10) by a double arrow and a first arrangement 66 and a second arrangement 68 (indicated by dashed lines) of the blade 70. In the present case, the outer diameter of the impeller wheel 20, 26, 32 is also changed by varying the curvature. A stronger curvature of the blades 22, 28, 34 with respect to the radial direction 45 causes a smaller outer diameter of the impeller wheel 20, 26, 32. A smaller curvature of the blades 22, 28, 34 with respect to the radial direction 45 causes a larger outer diameter of the impeller wheel 20, 26, 32.

Figure 12:
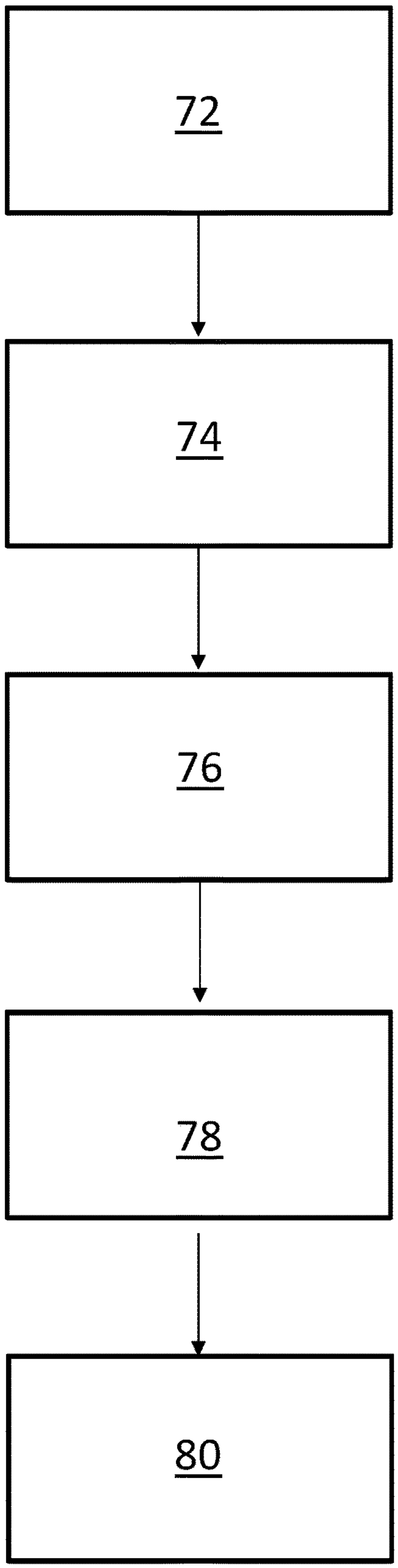

FIG. 12 shows a flow diagram of a method for providing an optimized rotary press.

Here, the method step of providing a first rotary press 12 having an adjustable filling unit 10, wherein the adjustable filling unit 10 includes at least one element having at least one adjustable configuration parameter is denoted by reference numeral 72.

The subsequent method step of producing multiple tablets with the first rotary press 12, each with different settings of the configuration parameter, is denoted by the reference numeral 74.

This method step 74 can be performed any number of times with any number of different configuration parameters.

After the tablets have been produced, the method step of analyzing the produced tablets for desired properties, in particular quality characteristics, follows in order to identify a tablet with preferred properties among the produced tablets. This method step is designated by the reference number 76 in FIG. 12.

The method step of identifying the configuration parameter setting at which the tablet with preferred properties was produced is identified by reference numeral 78.

The final method step of providing at least a second rotary press with an optimized filling unit, wherein the optimized filling unit comprises at least one element with a fixed predetermined configuration parameter, in which the tablet with preferred properties has been produced, is marked with the reference number 80. It is also conceivable that, as an alternative or in addition to providing a second rotary press, the first rotary press can be converted into a rotary press with an optimized filling unit.

The flow diagram shown in FIG. 12 is intended in particular to illustrate the chronological sequence of the individual method steps 72, 74, 76, 78 and 80. The method steps 72, 74, 76, 78 and 80 are carried out one after the other in the sequence shown in the flow diagram.

However, it is also conceivable that a method step is repeated any number of times before a next method step is carried out.

What is claimed is:

1. A filling unit (10) for a rotary press (12), the filling unit (10) comprising:

a filling wheel (14) configured to fill a medium to be dosed into die bores (16) of a die disk (18) of the rotary press (12); wherein the filling wheel (14) is an impeller wheel (20) configured to convey the medium to be dosed by a rotating movement of blades (22);

a dosing wheel (24) configured to dose a quantity of medium to be dosed into the respective die bores (16) of the die disk (18), wherein the dosing wheel (24) is an impeller wheel (26) configured to dose the amount of medium to be dosed by sweeping over the die bores (16) of the die disk (18) with rotating movement of blades (28);

at least one medium feed unit (36) configured to feed the medium to the filling wheel (14), wherein the blades (22, 28) of the filling wheel (14) and/or dosing wheel (24) each have a conveying surface (40) with which the respective impeller wheel (20, 26) conveys the medium, wherein the blades (22, 28) of the filling wheel (14) and dosing wheel (24) are configured such that the conveying surface (40) of the respective blades (22, 28) can be varied in shape, wherein the blades (22, 28) of the filling wheel (14) and/or dosing wheel (24) have a triangular or an at least partially rounded cross-section, wherein the shape of the conveying surface (40) is variable by a rotation of the blades (22, 28) and without disassembly and/or replacement of the blades (22, 28)

of the filling wheel (14) and/or dosing wheel (24) about a respective extension axis (38), or by a variable inclination of the blades (22, 28) and without disassembly and/or replacement of the blades (22, 28) of the filling wheel (14) and/or dosing wheel (24) with respect to a radial direction (45) extending from an axis of rotation (42) of the respective impeller wheel (20, 26), or by a variable curvature of the blades (22, 28) and without disassembly and/or replacement of the blades (22, 28) of the filling wheel (14) and/or dosing wheel (24).

2. The filling unit (10) according to claim 1, wherein the blades (22, 28) of the filling wheel (14) and/or dosing wheel (24) are configured to be displaceable parallel to the axis of rotation (42) of the respective impeller wheel (20, 26).

3. The filling unit (10) according to claim 1, wherein the blades (22, 28, 34) of the filling wheel (14) and/or dosing wheel (24) have a constant cross-section along at least one region of their respective extension axis (38).

4. The filling unit (10) according to claim 1, wherein the blades (22, 28, 34) of the filling wheel (14) and/or dosing wheel (24) are configured to be exchangeable.

5. The filling unit (10) according to claim 1, wherein the filling wheel (14) and/or dosing wheel (24) each have blades (22, 28) with a different cross-section along their respective extension axis (38).

6. The filling unit (10) according to claim 1, wherein the blades (22, 28) of the filling wheel (14) and/or dosing wheel (24) are arranged in such a way that an extension of the respective extension axis (38) runs at a distance from an axis of rotation (42) of the respective impeller wheel (20, 26).

7. The filling unit (10) according to claim 1, wherein the filling unit (10) is designed in such a way that a direction of rotation and/or a speed of rotation of the filling wheel (14) and/or dosing wheel (24) can be varied.

8. The filling unit (10) according to claim 1, wherein the medium feed unit (36) comprises a conveying switch by which the medium to be dosed can be fed selectively to the filling wheel (14).

9. The filling unit (10) according to claim 1, wherein the filling unit (10) has at least one electric motor (50), wherein the filling wheel (14) and/or dosing wheel (24) is driven by the at least one electric motor (50) directly or via at least one gear wheel (48), and/or wherein the rotational position of the blades (22, 28) and/or the inclination of the blades (22, 28) with respect to a radial direction (45) extending from an axis of rotation (42) of the respective impeller wheel (20, 26) is varied by the at least one electric motor (50) directly or via the at least one gear wheel (46).

10. The filling unit (10) according to claim 1, wherein the blades (22, 28) of the filling wheel (14) and/or dosing wheel (24) are designed to be rotatable by more than 180°.

11. The filling unit (10) according to claim 1, wherein the blades (22, 28) of the filling wheel (14) and/or dosing wheel (24) have a cross-section which has at least one corner and a rounded section.

12. A method of providing an optimized rotary press comprising the steps of:

providing a first rotary press (12) having an adjustable filling unit (10), the adjustable filling unit (10) having at least one element with at least one adjustable configuration parameter;

producing a plurality of tablets with the first rotary press (12) with different settings of the configuration parameter in each case;

analyzing the produced tablets for desired properties to identify a tablet with preferred properties among the produced tablets;

identifying the setting of the configuration parameter at which the tablet with preferred properties was produced; and providing at least a second rotary press having an optimized filling unit, the optimized filling unit having at least one element with a fixed predetermined configuration parameter at which the tablet with preferred properties was produced, wherein the adjustable filling unit is a filling unit (10) according to claim 1.

13. The method according to claim 12, wherein the adjustable configuration parameter is a direction of rotation or a speed of rotation of the filling wheel (14) and/or dosing wheel (24), or a shape of the conveying surfaces (40) of the blades (22, 28), a shape of the conveying surfaces (40) being varied by a rotation of the blades (22, 28) about their respective extension axis (38), or by an inclination of the blades (22, 28) with respect to a radial direction (45) extending from the axis of rotation (42) of the respective impeller wheel (20, 26), or by varying a curvature of the blades (22, 28).

14. The method according to claim 12, wherein in the step of producing tablets with the first rotary press (12), the settings for several configuration parameters are changed simultaneously.

15. The filling unit (10) according to claim 1, further comprising a feed wheel (30) configured to feed the medium to be dosed to the filling wheel (14), wherein the feed wheel (30) is an impeller wheel (32) configured to convey the medium to be fed to the filling wheel (14) by a rotating movement of blades (34).

16. The fillling unit (10) according to claim 15, wherein the filling unit (10) is configured such that the feed wheel (30) can be switched into or out of a conveying path of the medium to be dosed.

* * * * *